US 6,615,606 B2

(12) United States Patent
Zywiak

(10) Patent No.: US 6,615,606 B2
(45) Date of Patent: Sep. 9, 2003

(54) DUAL TURBINE BOOTSTRAP CYCLE ENVIRONMENTAL CONTROL SYSTEM

(75) Inventor: Thomas M. Zywiak, Suffield, CT (US)

(73) Assignee: Hamilton Sundstrand, Windsor Locks, CT (US)

( * ) Notice: Subject to any disclaimer, the term of this patent is extended or adjusted under 35 U.S.C. 154(b) by 0 days.

(21) Appl. No.: 10/044,128

(22) Filed: Jan. 10, 2002

(65) Prior Publication Data

US 2003/0126880 A1 Jul. 10, 2003

(51) Int. Cl.[7] ............................... F25B 9/00; F25D 9/00
(52) U.S. Cl. ............................................. 62/402; 62/87
(58) Field of Search .......................... 62/402, 112, 87, 62/86, 88

(56) References Cited

U.S. PATENT DOCUMENTS

| | | | |
|---|---|---|---|
| 4,430,867 A | * | 2/1984 | Warner .......................... 62/402 |
| 5,086,622 A | | 2/1992 | Warner |
| 5,343,692 A | | 9/1994 | Thomson et al. |
| 5,461,882 A | | 10/1995 | Zywiak |
| 5,906,111 A | | 5/1999 | Lui |
| 5,918,472 A | * | 7/1999 | Jonqueres ....................... 62/87 |
| 6,058,715 A | | 5/2000 | Strang et al. |
| 6,070,418 A | | 6/2000 | Crabtree et al. |
| 6,151,909 A | | 11/2000 | Carter et al. |
| 6,250,097 B1 | | 6/2001 | Lui et al. |
| 6,257,003 B1 | | 7/2001 | Hipsky |
| 6,526,775 B1 | * | 3/2003 | Asfia et al. .................... 62/402 |

FOREIGN PATENT DOCUMENTS

| | | |
|---|---|---|
| EP | 0 248 578 A2 | 12/1987 |
| WO | WO 01/26967 A1 | 4/2001 |

OTHER PUBLICATIONS

European Search Report, dated Mar. 14, 2003.

* cited by examiner

Primary Examiner—Melvin Jones
(74) Attorney, Agent, or Firm—Carlson, Gaskey & Olds

(57) ABSTRACT

An environmental control system (ECS) includes an air cycle machine (ACM) subsystem that is in a heat exchange relationship with one or more liquid cycle subsystems. Compressed air which exits a compressor section of the ACM is communicated to a reheater and a condenser to further cool the water vapor bearing air by condensing and separating the water into a water extractor. Dehumidified air exits the extractor and is communicated to an air-liquid heat exchanger to absorb a first heat load. The heated dehumidified air recovers thermal energy from the air-liquid heat exchanger and is expanded over a first turbine. The expanded air is communicated through the condenser and reheater such that the expanded air absorbs thermal energy therefrom. The recovered thermal energy in the expanded air then used by a second turbine to increase its efficiency. The expanded air from the second turbine is placed in the thermal exchange with a second air-liquid heat exchanger to absorb a second heat load.

24 Claims, 1 Drawing Sheet

DUAL TURBINE BOOTSTRAP CYCLE ENVIRONMENTAL CONTROL SYSTEM

BACKGROUND OF THE INVENTION

The present invention relates to environmental control systems (ECSs), and more particularly to an air cycle subsystem that is in a heat exchange relationship with one or more liquid cycle subsystems.

ECSs provide a supply of conditioned air to an enclosure, such as an aircraft cabin and cockpit. Conventional ECSs have utilized an air-to-air cycle cooling system which is in a heat exchange relationship with a liquid loop. The liquid loop typically cools other heat loads such as avionics packages. Interaction between the air and liquid subsystems is relatively complex. Moreover, air flow sequencing, particularly for multi-turbine ACMs, radically effects ECS efficiency. In many instances much thermal energy is wasted or otherwise inefficiently used.

In one conventional system, a flow of bleed air is taken from an intermediate or high pressure stage within a jet engine. The bleed air is pre-cooled within an air-to-air heat exchanger with heat being rejected to RAM air and then flowed to a compressor of the ACM. After compression, the air is routed through a second air-to-air heat exchanger, a regenerative heat exchanger and an air-to-air reheater heat exchanger. Condensed water vapor is extracted by a water extractor, and dehumidified air is routed to a turbine. Expanded air from the turbine flows through another water collector and into a liquid-to-air heat exchanger of the liquid loop. A relatively warmer liquid in the liquid loop which is used to cool the avionics is thereby cooled. From the liquid-to-air heat exchanger, the air passes through the reheater heat exchanger. The dehumidified air is then passed into a second turbine of the ACM where it is again expanded and passed through another liquid-to-air heat exchanger to further absorb heat from the liquid loop.

Disadvantageously, convention air flow sequences may not effectively reduce heat loads and relatively numerous reheaters and water extractors are required. The water extractors must also extract water from the fog-like water vapor prevalent in conventional ECSs. This may be a relatively difficult and energy inefficient process. Further, the additional components and ducting of the air cycle subsystem increases complexity which may offset the space reductions obtained with the relatively smaller liquid-to-air heat exchangers.

Accordingly, it is desirable to provide an air flow sequence for an ECS which more efficiently utilizes the bleed air as a cooling medium. It is further desirable to recover thermal energy from a liquid cycle subsystem to further increase ACM efficiency.

SUMMARY OF THE INVENTION

The environmental control system (ECS) according to the present invention includes an air cycle subsystem that is in a heat exchange relationship with one or more liquid cycle subsystems. Bleed air is typically received from a gas turbine engine or other source and sent through an air-to-air heat exchanger prior to be communicated with an air cycle machine (ACM) having a first and second turbine.

Compressed air exits the compressor of the ACM and is communicated to a reheater and a condenser to further cool the water vapor bearing air by condensing and separating the water into a water extractor. As the water vapor bearing air is passed directly from the reheater to the condenser, the water from the water vapor forms as relatively large droplets which are readily collected by the extractor. Such droplets are comparably easy to separate as compared to fog-like water vapor bearing air.

Dehumidified air exits the extractor and is communicated to an air-liquid heat exchanger of the liquid cycle subsystem. The liquid cycle subsystem reduces the thermal energy from a heat load which is typically an avionics subsystem. Dehumidified heated air exits the first air-liquid heat exchanger and is communicated with the first turbine. The air is expanded through the first turbine of the ACM between the first turbine inlet pressure and the second turbine outlet pressure. Recovered heat from the first air-liquid heat exchanger increases available power of the first turbine.

The discharge pressure from the first turbine is maintained at a discharge temperature just above freezing (midpressure) so that the first turbine outlet air operates as a heat sink for the condenser and reheater. The first turbine outlet air recovers further thermal energy from the condenser and the reheater.

Heated air exits the reheater and is communicated with the second turbine. The recovered thermal energy from the condenser and the reheater is used by the second turbine to increase its efficiency. The air is expanded through the second turbine of the ACM and communicated with a second air-liquid heat exchanger to cool a second heat load. Thus, the performance of both turbines is improved from otherwise wasted thermal energy. Moreover, the increases available power advantageously allows the minimization of size and/or weight of the heat exchangers.

The present invention therefore provides an air flow sequence for an ECS which more efficiently utilizes the bleed air as a cooling medium. The present invention also recovers thermal energy from a liquid cycle subsystem to further increase the ACM power output.

BRIEF DESCRIPTION OF THE DRAWINGS

The various features and advantages of this invention will become apparent to those skilled in the art from the following detailed description of the currently preferred embodiment. The drawing that accompanies the detailed description can be briefly described as follows.

DETAILED DESCRIPTION OF THE PREFERRED EMBODIMENT

Figure 1:
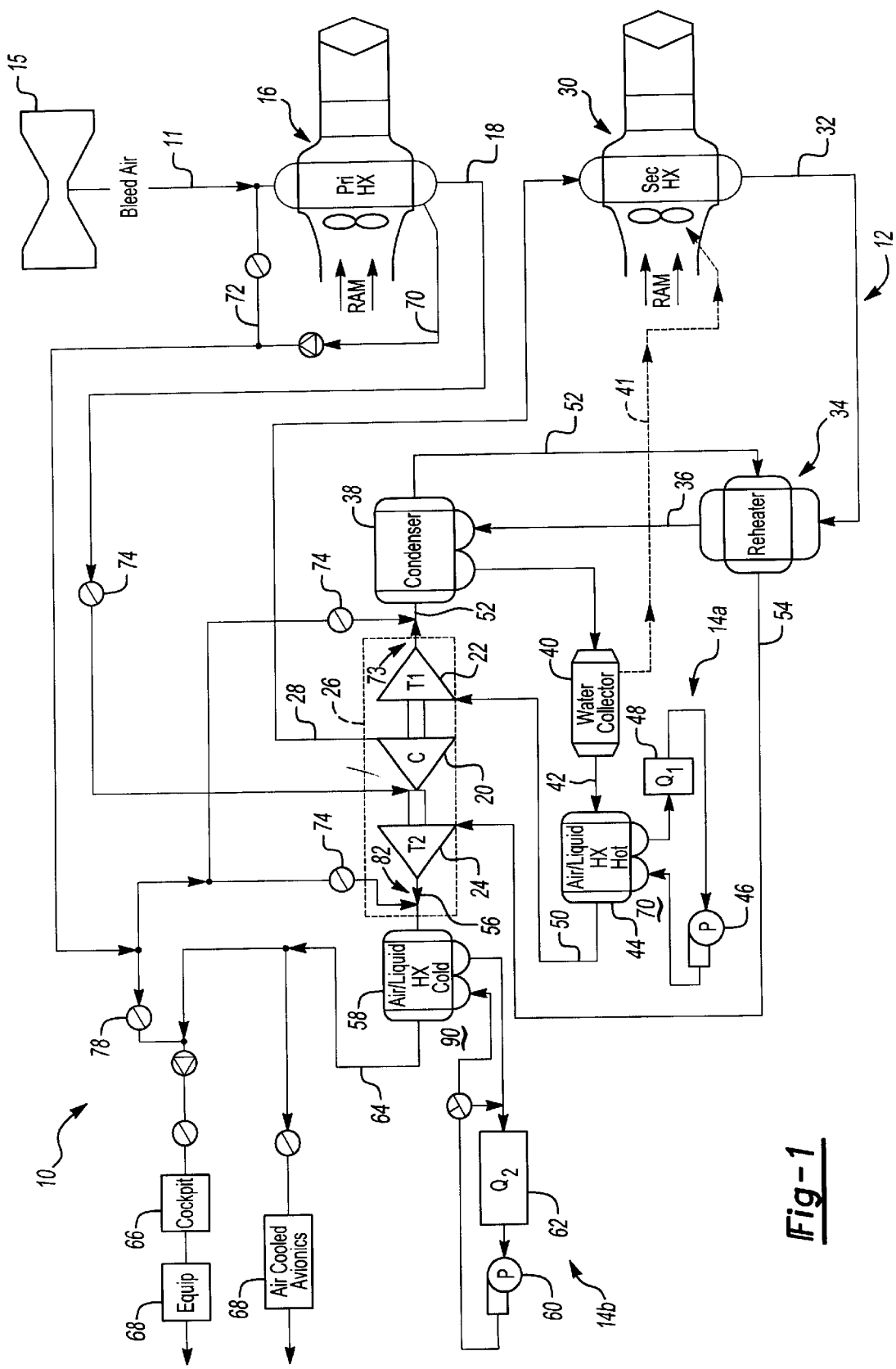
FIG. 1 is a schematic representation of environmental control system according to the present invention.

FIG. 1 illustrates a general schematic view of a liquid-to-air cycle system or environmental control system (ECS) 10. The ECS 10 includes an air cycle subsystem 12 that is in a heat exchange relationship with a liquid cycle subsystem 14a, 14b. It should be understood that although two separate liquid subsystems are disclosed in the illustrative embodiment, a single substantially continuous liquid subsystem will also benefit from the present invention.

Bleed air 11 is preferably received from a gas turbine engine (illustrated schematically at 15). The bleed air 11 is sent through a primary heat exchanger 16 such that the bleed air 11 is in heat exchange relationship with RAM or ambient air. The primary heat exchanger 16 is preferably an air-to-air exchanger. After the bleed air 11 is cooled in the primary heat exchanger 16, the resulting cooler air is communicated through a passage 18 which communicates with a compressor 20 where the air is compressed to a high pressure. The compressor 20 is preferably located upon a common shaft with a first turbine 22 and a second turbine 24. The compressor 20 and turbines 22, 24 define an air cycle machine (ACM) 26.

Compressed air exits the compressor 20 through a passage 28 which communicates with a secondary heat exchanger 30. The secondary heat exchanger 30 is preferably an air-to-air exchanger which further cools the compressed air by heat exchange with a RAM air. Compressed, cooled and water vapor bearing air exits the secondary heat exchanger 30 and flows through a duct 32 which communicates with a reheater 34.

The reheater 34 further cools the water vapor bearing air which exits the reheater 34 through a passage 36. Passage 36 communicates with a condenser 38 which further cools the water vapor bearing air by condensing and separating the water into a water extractor 40. As the water vapor bearing air is passed directly from the reheater 34 to the condenser 38, the water from the water vapor condenses relatively easily. That is, the water which condensed within the condenser 38 forms as relatively large droplets which are readily collected by the extractor 40. Such droplets are comparably easy to separate as compared to the fog-like water vapor bearing air which exits a turbine as, for example, in U.S. Pat. No. 6,250,097.

The extractor 40 is preferably a high pressure collector which further facilitates separation of water from the air. The present invention thereby provides for removal of approximately 95% of the water content at an early stage in the ECS 10, although the amount can vary depending upon optimization. Water which is collected in the extractor 40 is preferably sprayed (illustrated schematically at 41) on the secondary heat exchanger 30 to improve the efficiency thereof.

Dehumidified air exits the extractor 40 and is communicated through a passage 42 to a first air-liquid heat exchanger 44. The first air-liquid heat exchanger 44 is part of the air cycle subsystem 12 and the liquid cycle subsystem 14a to form a heat exchange relationship therebetween. Moreover, any small amount of moisture which may remain in the air is removed as the temperature of the air is increased by passage through the first air-liquid heat exchanger 44.

The liquid cycle subsystem 14a, is preferably a closed system and utilizes a liquid coolant, such as polyalphaolephin (PAO) which is cycled by a pump 46 or the like. The liquid coolant functions as a coolant medium for a heat load 48 and as a heat source for the dehumidified air which is passing through passage 42. The heat load 48 is typically an avionics subsystem which generates a rather large amount of heat—typically around 160 degrees Fahrenheit. The heat exchange process therein between the liquid coolant in the liquid cycle subsystem 14a and the air communicated through passage 42 cools the liquid removes heat from the load 48 and heats the air exiting the first air-liquid heat exchanger 44.

Dehumidified heated air exits the first air-liquid heat exchanger 44 through a passage 50 which communicates with the first turbine 22. The air is expanded through the first turbine of the ACM 26 between an inlet pressure of the first turbine 22 and an outlet pressure of the second turbine 24. The first turbine 22 also assists in condensing any water vapor which may still be in the air as a result of the air being expanded and thus cooled.

The recovered heat from the first air-liquid heat exchanger 44 is used by the first turbine 22, for example, to increase its rotating speed, boost its pressure ratio, increase its power and increase the expansion of the reheated air. Further, the first turbine 22 is mechanically engaged to the compressor 20 and the second turbine 24. Thus, heat or energy absorbed by the first turbine 22 is further converted to useful energy by the compressor 20.

The discharge pressure from the first turbine 22 is maintained at a discharge temperature just above freezing (mid-pressure) so that the first turbine 22 outlet air which passes through a passage 52 operates as a heat sink for the condenser 38 and the reheater 34. That is, the temperature of the air which exits the first turbine 22 is heated by the condenser 38 and reheater 34.

Heated air exits the reheater 34 through a passage 54 which communicates with the second turbine 24. The recovered heat from the condenser 38 and the reheater 34 is now used by the second turbine 24, for example, to increase its rotating speed, boost its pressure ratio, increase its power and increase the expansion of the reheated air. Thus, the performance of both turbines 22, 24 is improved from otherwise wasted energy. Moreover, the increased turbine cooling advantageously allows the minimization of size and/or weight of the heat exchangers.

The air is expanded through the second turbine 24 of the ACM 26. The discharge pressure from the second turbine 24 is preferably maintained at a discharge temperature just below freezing. The second turbine 24 outlet air passes through a passage 56 which communicates with a second air-liquid heat exchanger 58. The second air-liquid heat exchanger 58 forms part of the air cycle subsystem 12 and the liquid cycle subsystem 14b to form a heat exchange relationship therebetween.

The liquid cycle subsystem 14b, is preferably a closed system as described above. The liquid coolant of the liquid cycle subsystem 14b is cycled by a pump 60 and functions as a coolant medium for a second heat load 62. An operating temperature of the second heat load 62 is preferably lower than the operating temperature of the first heat load 48—typically around 75 degrees Fahrenheit—but also cools other downstream heat loads. It should be understood that the operating temperatures of the heat loads are representative and other operating temperatures will also be applicable to the present invention.

The heat exchange process therein between the liquid coolant in the liquid cycle subsystem 14b and the air communicated through passage 56 cools the liquid, removes heat from the load 62 and heats the air exiting the second air-liquid heat exchanger 58. The relatively warmer air exits second air-liquid heat exchanger 58 through a passage 64 which communicates with cockpit 66 and/or other air loads 68 to provide cooling air therefor.

In the event that it is desired to modulate the supply from the first turbine 22, second turbine 24, cockpit 66 and/or the air loads 68, a temperature control passage 70, 72 communicates directly with bleed air 11 prior and/or subsequent to the primary heat exchanger 16. Control valves 74 are preferably located just downstream of the first turbine 22 and the second turbine 24, and just upstream of the cockpit 66 and/or the air loads 68 to allow warm air mixture therewith. Operation of such control valves may be implemented by a microprocessor based electronic system (either digital or analog; not shown).

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An environmental control system comprising:
   an air conditioning machine comprising a first turbine, a second turbine and a compressor;
   a condenser in communication with an outlet from said first turbine;
   a water collector in communication with said condenser;
   a liquid cycle subsystem comprising an air-to-liquid heat exchanger in communication with said water collector and an inlet to said first turbine; and
   a first heat load in heat exchange relationship with said liquid cycle subsystem.

2. The environmental control system as recited in claim 1, further comprising an air-to-air heat exchanger in communication with an outlet of said compressor, said air-to-air heat exchanger in communication with an inlet to said reheater.

3. The environmental control system as recited in claim 1, further comprising a primary air-to-air heat exchanger in communication with an inlet to said compressor, said air-to-air heat exchanger in communication with a bleed air source.

4. The environmental control system as recited in claim 1, wherein said condenser is in communication with a reheater, said reheater in communication with an inlet to said second turbine.

5. The environmental control system as recited in claim 1, further comprising a second liquid cycle subsystem comprising a second air-to-liquid heat exchanger in communication with an outlet from said second turbine, and a second heat load in heat exchange relationship with said second liquid cycle subsystem.

6. The environmental control system as recited in claim 5, further comprising an air load in communication with an outlet from said second air-to-liquid heat exchanger.

7. The environmental control system as recited in claim 5, wherein said liquid cycle subsystem is independent from said second liquid cycle subsystem.

8. The environmental control system as recited in claim 5, wherein an operating temperature of said second heat load is lower than an operating temperature of said first heat load.

9. The environmental control system as recited in claim 1, wherein an outlet temperature of said first turbine is above freezing.

10. The environmental control system as recited in claim 1, wherein an outlet temperature of said second turbine is below freezing.

11. An environmental control system comprising:
    an air conditioning machine comprising a first turbine, a second turbine and a compressor;
    a condenser in communication with an outlet from said first turbine;
    a water collector in communication with said condenser;
    a first liquid cycle subsystem comprising a first air-to-liquid heat exchanger in communication with said water collector and an inlet to said first turbine;
    a first heat load in heat exchange relationship with said first liquid cycle subsystem;
    an outlet of said condenser in communication with an inlet of a reheater, and an outlet of said reheater in communication with an inlet of said second turbine;
    a second liquid cycle subsystem comprising a second air-to-liquid heat exchanger in communication with an outlet of said second turbine; and
    a second heat load in heat exchange relationship with said second liquid cycle subsystem.

12. The environmental control system as recited in claim 11, further comprising a primary air-to-air heat exchanger in communication with an inlet to said compressor, said primary air-to-air heat exchanger in communication with a bleed air source.

13. The environmental control system as recited in claim 12, further comprising a secondary air-to-air heat exchanger in communication with an outlet of said compressor, said secondary air-to-air heat exchanger in communication with an inlet to said reheater.

14. The environmental control system as recited in claim 13, wherein said outlet from said first turbine communicates with said condenser and said reheater such that expanded air flow from said first turbine recovers thermal energy from an air flow downstream from said secondary air-to-air heat exchanger.

15. The environmental control system as recited in claim 11, wherein said water collector comprises a high pressure water collector.

16. A method of conditioning water vapor bearing bleed air for supply as conditioned air comprising the steps of:
    (1) communicating a bleed air to a reheater to extract thermal energy from the bleed air;
    (2) condensing the bleed air after said step (1);
    (3) extracting water from the bleed air after said step (2) such that the bleed air is dehumidified; and
    (4) communicating the dehumidified bleed of said step (3) air through an air-liquid heat exchanger of a first liquid cycle subsystem such that the dehumidified bleed air recovers thermal energy from the first liquid cycle subsystem.

17. A method as recited in claim 16, further comprising the step of compressing the bleed air prior to communicating the bleed air to the reheater in said step (1).

18. A method as recited in claim 17, further comprising the step of communicating the compressed bleed air through an air-to-air heat exchanger to extract thermal energy from the bleed air prior to communicating the bleed air to the reheater in said step (1).

19. A method as recited in claim 16, wherein said step (2) comprises condensing the bleed air as droplets within the condenser.

20. A method as recited in claim 16, further comprising the steps of:
    (5) communicating the substantially dehumidified bleed air from the air-liquid heat exchanger to a turbine after said step (4);
    (6) expanding the bleed air in the turbine after said step (5); and
    (7) communicating the expanded bleed air through the condenser after said step (6) such that the expanded bleed air recovers thermal energy from the condenser.

21. A method as recited in claim 20, further comprising communicating the expanded bleed air from the condenser through the reheater such that the expanded bleed air recovers thermal energy from the reheater.

22. A method of conditioning water vapor bearing bleed air for supply as conditioned air comprising the steps of:

(1) communicating a bleed air to a compressor;
(2) compressing the bleed air;
(3) communicating the compressed bleed air through an air-to-air heat exchanger to extract thermal energy from the bleed air;
(4) communicating the bleed air from the air-to-air heat exchanger to a reheater to extract thermal energy from the bleed air;
(5) condensing the bleed air after said step (4);
(6) extracting water from the bleed air after said step (5) such that the bleed air is dehumidified;
(7) communicating the dehumidified bleed air through an air-liquid heat exchanger of a first liquid cycle subsystem such that the dehumidified bleed air recovers thermal energy from the first liquid cycle subsystem;
(8) communicating the dehumidified bleed air to a first turbine;
(9) expanding the bleed air in the first turbine such that the expanded bleed air is above freezing;
(10) communicating the expanded bleed air from said step (9) through the condenser such that the expanded bleed air recovers thermal energy from the condenser;
(11) communicating the expanded bleed air from said step (10) through a reheater such that the expanded bleed air recovers thermal energy from the reheater; and
(12) communicating the expanded bleed air to a second turbine.

23. A method as recited in claim 22, further comprising the steps of:
(13) expanding the bleed air in the second turbine after said (12) such that said expanded bleed air is below freezing; and
(14) communicating the expanded bleed air through a second air-liquid heat exchanger of a second liquid cycle subsystem such that the expanded bleed air recovers thermal energy from the second liquid cycle subsystem.

24. A method as recited in claim 23, further comprising communicating the expanded bleed air from the second liquid cycle subsystem to an air load such that the expanded bleed air absorbs thermal energy from the air load.

* * * * *

UNITED STATES PATENT AND TRADEMARK OFFICE
CERTIFICATE OF CORRECTION

PATENT NO.    : 6,615,606 B2
DATED         : September 9, 2003
INVENTOR(S)   : Thomas M. Zywiak It is certified that error appears in the above-identified patent and that said Letters Patent is hereby corrected as shown below:

<u>Title page,</u>
Item [*] Notice, "0 days" should be -- 57 days --

Signed and Sealed this

Twenty-third Day of December, 2003

JAMES E. ROGAN
*Director of the United States Patent and Trademark Office*